United States Patent [19]

Finegold

[11] 4,158,314
[45] Jun. 19, 1979

[54] HIGH SPEED STATOR WINDER

[75] Inventor: Hyman B. Finegold, Dayton, Ohio

[73] Assignee: The Globe Tool and Engineering Company, Dayton, Ohio

[21] Appl. No.: 852,566

[22] Filed: Nov. 17, 1977

[51] Int. Cl.² .............................................. F16H 22/44
[52] U.S. Cl. ..................................... 74/23; 242/1.1 R
[58] Field of Search .......................... 74/22 R, 23, 50; 242/1.1 R

[56] References Cited

U.S. PATENT DOCUMENTS

| 3,052,418 | 9/1962 | Gorski et al. | 242/1.1 |
|---|---|---|---|
| 3,276,275 | 10/1966 | Ebbert | 74/23 |
| 3,493,186 | 2/1970 | Arick | 74/23 |
| 3,857,496 | 12/1974 | Gonzales | 74/23 |

Primary Examiner—Samuel Scott
Assistant Examiner—Wesley S. Ratliff, Jr.
Attorney, Agent, or Firm—Dybvig & Dybvig

[57] ABSTRACT

A reciprocating and oscillating ram for a winding head is reciprocated and oscillated at high speeds by a single drive shaft and a rotary to reciprocatory and oscillatory movement mechanism including a carriage, adjustable Scotch yoke drive means reciprocally driving the carriage, a rack bar slidably mounted on the carriage and a pinion member engaging rack teeth on the rack bar and affixed to the ram. The rack bar follows reciprocal movements of a plate that carries cam followers driven by a cam mounted on the drive shaft. The Scotch yoke mechanism includes an adjustable length crank arm with a counterbalance. The movements of the carriage are counterbalanced by reciprocatory movement of a counterbalance carriage driven by a similar crank arm.

Wire is guided to the ram by a non-rotating wire feed tube connected to the carriage for reciprocation therewith and projecting to the rear of the machine. A wire guide pulley is mounted on the rear end of the feed tube for guiding wire from a wire source.

3 Claims, 7 Drawing Figures

HIGH SPEED STATOR WINDER

BACKGROUND OF THE INVENTION

This invention relates to stator winding machines and particularly machines of the type having a winding head mounted on a ram that is reciprocated and oscillated to form coils of wire on stator cores. Such machines normally include a rotating drive shaft and a rotary to reciprocatory and oscillatory drive mechanism.

This invention further relates to improvements in rotary to reciprocatory and oscillatory drive mechanisms, this invention being potentially useful for purposes other than stator winding. More particularly, this invention relates to such improvements using a Scotch yoke.

Typical stator winding machines employing rotary to reciprocatory and oscillatory drive mechanisms are shown in the following U.S. Pat. Nos.:

Moore Re. 25,281 granted Nov. 6, 1962;
Eminger 2,949,789 granted Aug. 23, 1960;
Gorski et al 3,052,418 granted Sept. 4, 1962;
Moore 3,251,559 granted May 17, 1966;
Eminger 3,460,770 granted Aug. 12, 1969;
Lill 3,768,319 granted Oct. 30, 1973.

Prior machines of this type utilize barrel cams, gear connections to achieve timing of the reciprocatory and oscillatory movements, elongate splined connections between parts, elaborate lever mechanisms and other complex parts that contribute to the expense of the machines and also may severely limit the attainable operating speeds.

SUMMARY OF THE INVENTION

This invention provides a rotary to reciprocatory and oscillatory drive mechanism especially useful in stator winding machines for obtaining high speed operation that is highly compact and efficient and avoids the use of splined shafts and other complicated mechanisms or devices to achieve synchronism between the reciprocating and oscillating movements. In addition this invention provides such a mechanism wherein the length of the reciprocating strokes may be easily adjusted without adversely affecting the timing between the reciprocating movements and the oscillating movements.

In accordance with this invention the reciprocating movements are obtained by a Scotch yoke mechanism including a crank driven by a drive shaft and a carriage having a yoke slidably receiving a crosshead. A winding ram is fixed to the carriage for reciprocating movement therewith. The ram is rotatably mounted on the carriage and caused to oscillate by a cam affixed to the drive shaft that is engaged by cam followers on a reciprocally mounted plate, the movements of which are followed by a rack bar mounted for vertical movement on the carriage. The rack bar has a rack with teeth engaging a gear segment affixed to the winding ram.

Further in accordance with this invention the effective length of the crank arm, i.e. the spacing between the crosshead and the axis of the drive shaft, is readily adjustable. A counterbalance plate that counterbalances the mass of the crank arm is automatically adjusted at the same time the crank arm is adjusted. The adjustment of the effective length of the crank arm serves to increase or decrease the length of the reciprocatory movements of the carriage. This adjustment is independent of the oscillatory drive so that the timing of the oscillatory movement of the ram is not affected by changing the length of the reciprocating stroke. The apparatus is thus readily changed over for winding stators having different lamination stack heights and thus different coil lengths.

This invention also contemplates an improvement in the manner in which the wires are fed to the winding head. Typically the winding ram comprises a hollow spindle that extends completely through the drive housing so that the wire enters a portion of the winding ram that is both reciprocating and oscillating at the rear of the machine. In accordance with this invention the winding ram terminates at the carriage and wire is guided to the winding ram by a wire feed tube connected to the carriage for reciprocatory movement therewith. The wire feed tube does not oscillate so that problems associated with guiding wire to an oscillating spindle are avoided.

Other objects and advantages will become apparent from the following description.

BRIEF DESCRIPTION OF THE DRAWINGS

FIG. 2 includes parts not shown in FIG. 1 and excludes other parts that are shown in FIG. 1.

In FIG. 7 parts have moved from the position thereof shown in FIG. 6.

DESCRIPTION OF THE PREFERRED EMBODIMENT

Figure 1:
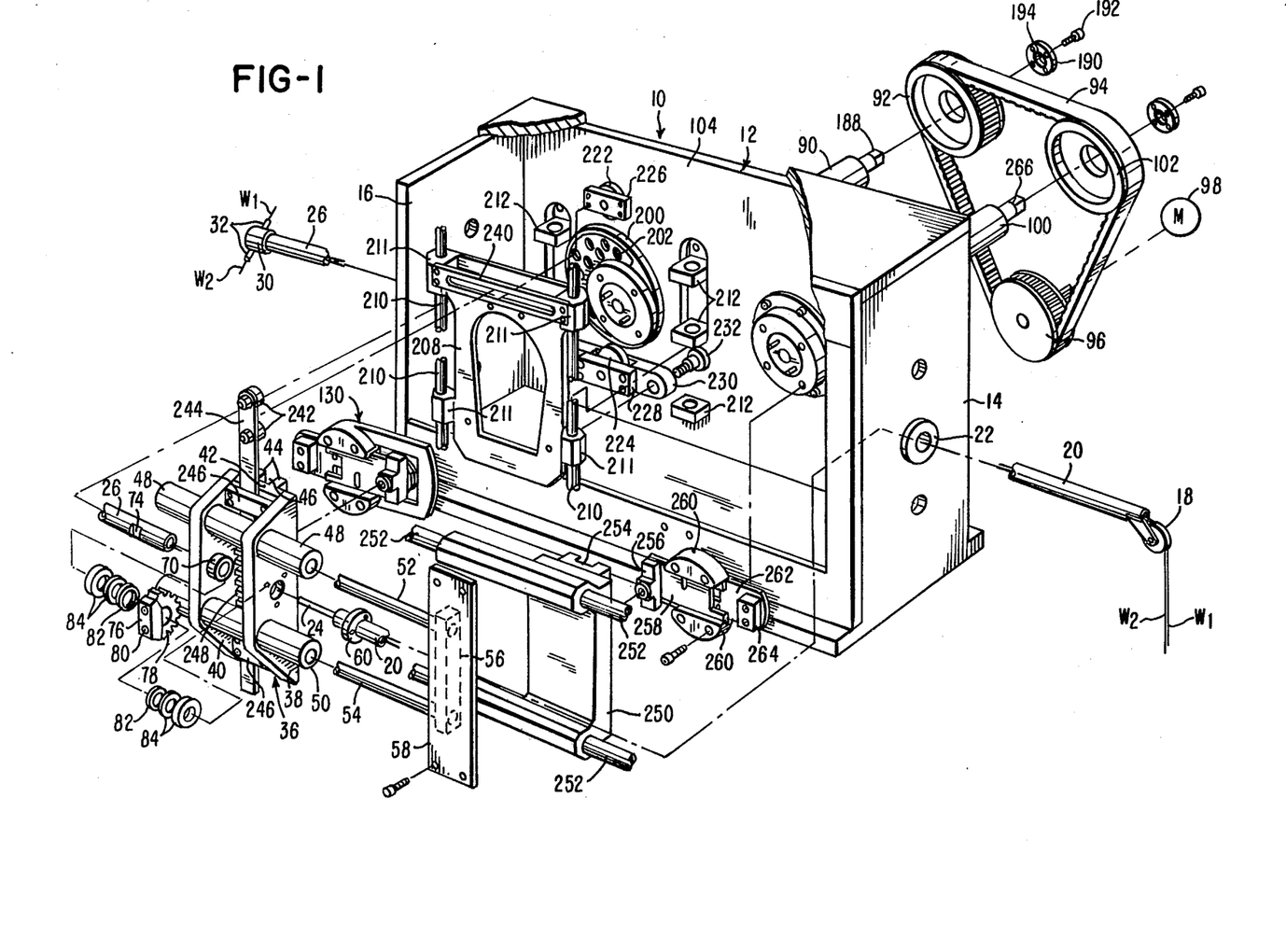
FIG. 1 is an exploded perspective view, simplified by omission of some parts, of the main drive housing and drive mechanisms for a stator winding machine made in accordance with this invention.
Figure 2:
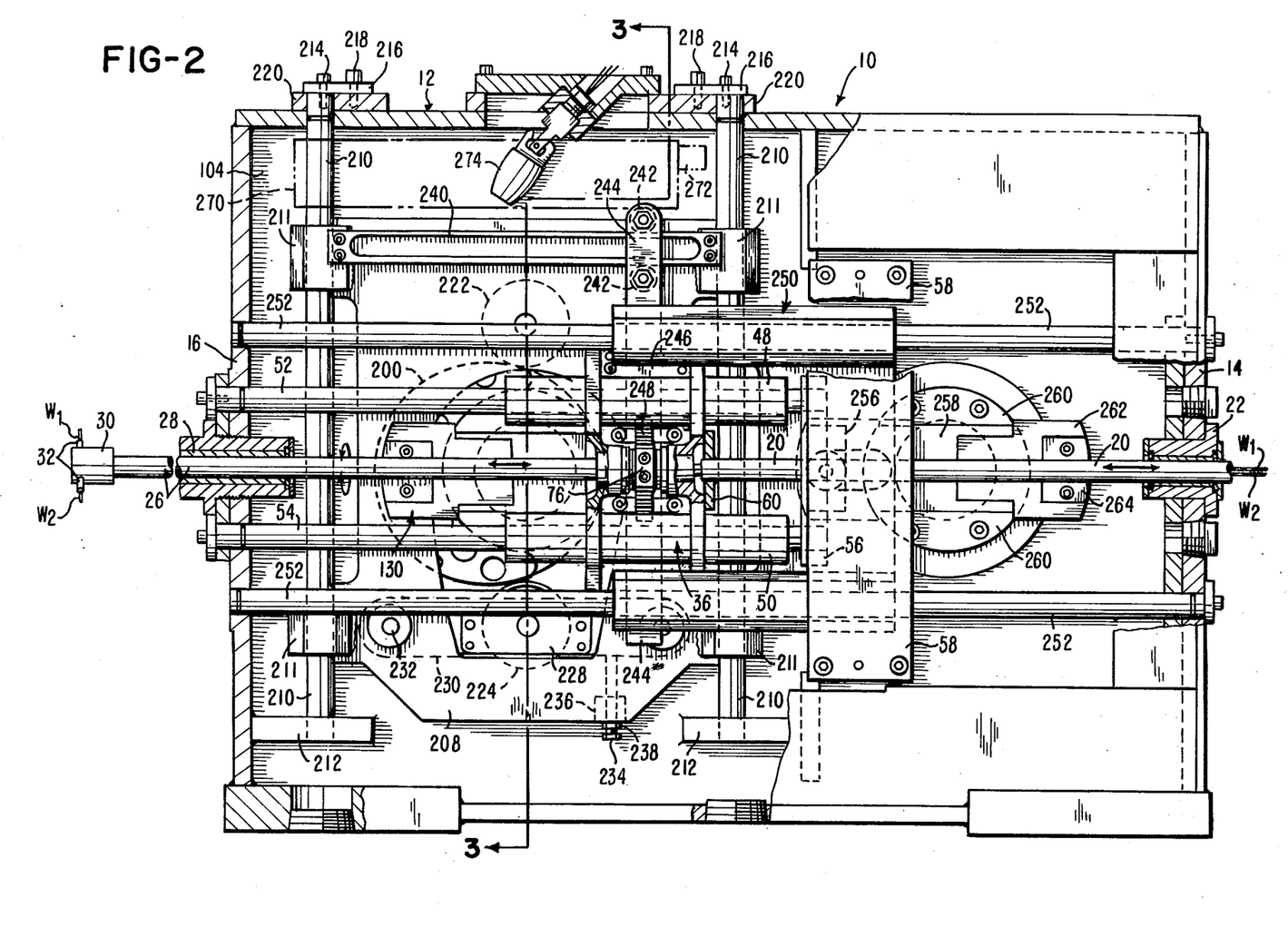
FIG. 2 is a side elevational view with parts in cross section of the apparatus shown in FIG. 1.

With reference to FIGS. 1 and 2, a stator winding machine in accordance with this invention is generally designated 10 and comprises a hollow box-like main drive housing 12 having a rear end plate 14 and a forward end plate 16.

A pair of wires $W_1$ and $W_2$ are coursed from wire supply reels (not shown) to a wire guide pulley 18 that guides the wires into a hollow wire feed tube 20 slidably mounted in a bearing 22 in the rear end plate 14. The wires extend through a feed nozzle 24 affixed to the end of the wire feed tube 20 opposite the pulley 18 into the rearward end of a winding ram 26 that is mounted by a bearing 28 in the forward end wall 16 for both reciprocatory and oscillatory motion. The forward end of the arm 26 carries a winding head 30 having oppositely extending wire guide needles 32 adapted to pass through stator cores for purposes of winding coils. As is known to those familiar with the art, a pair of coils will be formed by the wires $W_1$ and $W_2$ in response to reciprocatory motions of the ram 26 that carry the needles 32 through a stator core (not shown) and beyond both ends thereof and in response to oscillations of the ram 26 in one direction at one end of the stator core and in the opposite direction at the other end of the stator core. The described motions of the ram 26 and the needles 32 to cause the winding of coils is typical of this class of machine and it is a primary object of this invention to provide a mechanism for causing the necessary reciprocation and oscillation of the ram 26 at high speeds.

To accommodate the high winding speeds, the wires are preferably coursed to the wire guide pulley by a wire tension control apparatus of the type shown in U.S. patent application of Kenneth E. Peck, Jr., Ser. No. 734,534, filed Oct. 21, 1976, titled Wire Tension Control Apparatus Especially for Coil Winding Machines now U.S. Pat. No. 4,062,502 granted Dec. 13, 1977, the subject matter of which is incorporated herein by reference.

With continued reference to FIGS. 1 and 2, the drive mechanism includes a main drive carriage generally designated 36 comprising parallel plates constituting a rearward mounting plate 38 and a forward mounting plate 40. The plates 38 and 40 are connected by a vertical yoke plate 42 from which elongate flanges 44 project. The flanges 44 comprise a yoke defining a vertically extending slot 46 therebetween. A pair of guide tubes 48 and 50 fixed to and extending through aligned apertures in the mounting plates 38 and 40 are slidably received upon horizontal, upper and lower guide rods 52 and 54, respectively. Bearings (not shown) may be provided between the guide tubes 48 and 50 and the guide rods 52 and 54 which, when assembled, support the carriage 36 for reciprocal movement in the direction of the horizontal axis of the wire feed tube 20 and the ram 26. The rearward end of the guide rods 52 and 54 may be mounted in a support block 56 that is affixed to a frame plate 58 and the forward ends of the guide rods 52 and 54 may be mounted in the forward end plate 16 in any suitable fashion.

Figure 4:
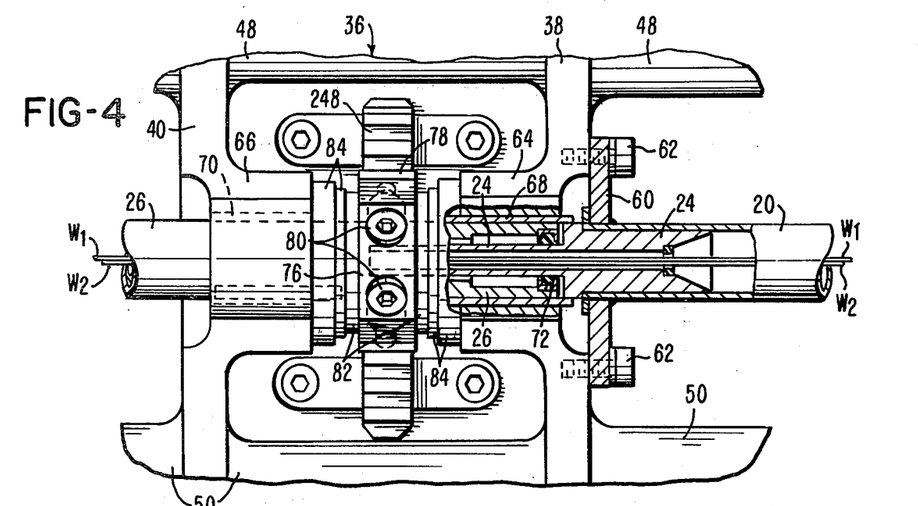
FIG. 4 is an enlarged fragmentary view with parts broken away and in section illustrating the manner in which a wire feed tube and the winding ram are mounted on a reciprocating carriage and further illustrating a portion of the apparatus for oscillating the ram.

With reference to FIGS. 2 and 4, a flange 60 is affixed to the forwward end of the wire feed tube 20 as by welding and connected to the rearward face of the rear mounting plate 38 as by bolts 62. The wire feed tube 20 is thus caused to reciprocate with the carriage 36 and prevented from rotating relative to the carriage.

The confronting surfaces of the mounting plates 38 and 40 along their vertical centers are formed with hub-like projections 64 and 66, respectively, that receive bearings 68 and 70, respectively, affixed thereto which rotatably receive the rearward end of the ram 26. A bearing is provided by an O-ring sealing member 72 between the extreme rearward end of the ram 26 and the forward end of the wire feed nozzle 24. The reason an O-ring seal is used for a bearing in this instance is that the drive housing 12 contains an oil bath for lubrication of the moving parts and the O-ring seal 72 prevents oil from exiting through the ram 26.

With reference to FIGS. 1 and 4, the ram 26 is provided with a flat or keyway 74 that receives a key 76 attached to a gear segment 78 by screws 80. As apparent, the key 76 and gear segment 78 are fixedly located centrally between the mounting plates 38 and 40 by plural bearings comprising thrust washers 82 bearing against the opposite sides of the assembled key 76 and gear segments 78 and bearing washers 84 that provide for relative rotation between the assembled key 76 and gear 78 and the confronting surfaces of the hub-like projections 64 and 66 of the mounting plates 38 and 40.

Termination of both the ram 26 and the feed tube 20 at the carriage 36, and the non-rotatable mounting of the feed tube 20 provides an advantage in that problems associated with mounting a wire guide pulley on an oscillating shaft are avoided. Thus, no special mounting or other devices are needed to accommodate or avoid high speed swinging of the guide pulley from side-to-side.

Reciprocation of the carriage 36 and accordingly the feed tube 20 and the ram 26 and oscillation of the ram 26 relative to the carriage 36 are all accomplished by rotation of a main drive shaft 90 to which a timing pulley 92 is fixed. The pulley 92 is engaged by a timing belt 94 driven by a drive pulley 96 that in turn is driven by a drive motor 98. For purposes which will be further described below, a counterbalance drive shaft 100 carries a timing pulley 102 engaged by the same timing belt 94.

Figure 3:
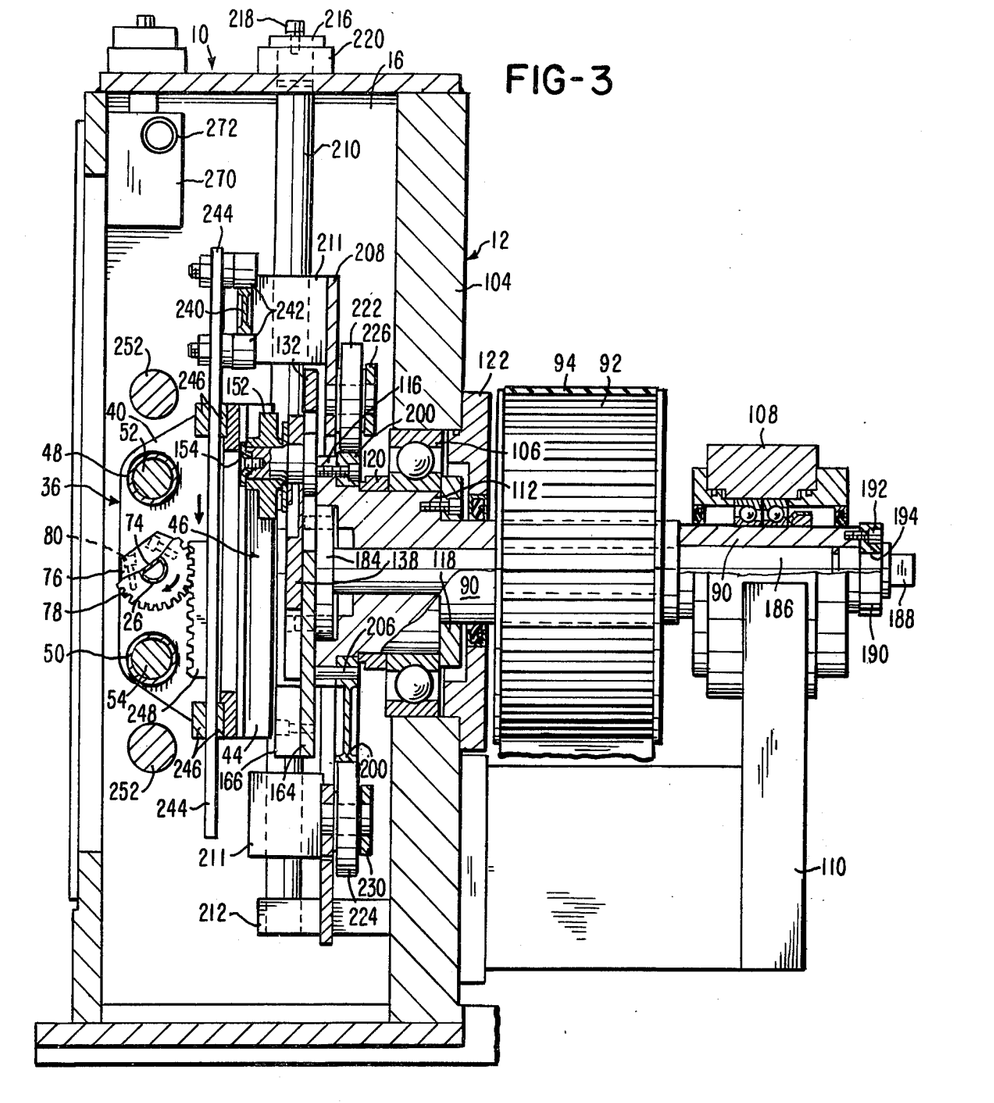
FIG. 3 is a vertical cross sectional view of the machine taken along line 3—3 of FIG. 2. However, in FIG. 3 some moving parts that the section line does not extend through are shown moved to positions generally aligned with the main drive shaft so that they appear in cross section.

With reference to FIG. 3, the main drive shaft 90 is of hollow construction and extends through a wall 104 of the housing 12 that for convenience is referred to as the far side wall and is journalled for rotation in a bearing 106 therein. The end of the main drive shaft 90 projecting outside the housing 12 has a reduced diameter and is supported by a bearing assembly 108 mounted in turn upon an outboard support structure 110 fixed to the far housing wall 104. The main drive shaft 90 has a first enlarged diameter portion 112 received in the bearing 106 and, inside the housing 12, has a second enlarged diameter portion 114 that is larger in diameter than the portion 112. At its extreme end inside the housing 12, the shaft 90 has a still larger diameter portion or flange 116. The first larger diameter portion 112 is trapped to the bearing 106 by a retaining ring 118 and a spacer 120. The aperture in the far wall 104 that receives the bearing 106 is sealed by a cap member 122.

Figure 5:
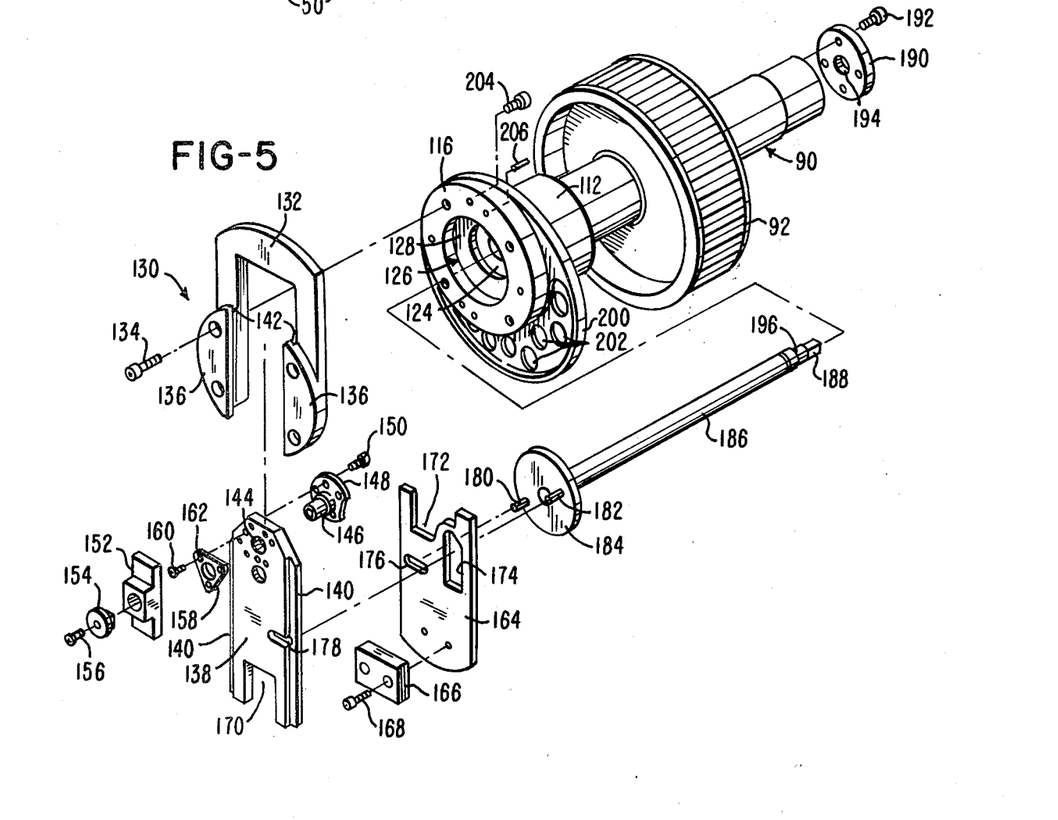
FIG. 5 is an exploded perspective view of the main drive shaft and the Scotch yoke crank arm assembly.

With reference to FIG. 5, and viewed from the end of the main drive shaft 90 inside the housing 12, the shaft 90 has a first counterbore 124 and a second larger diameter counterbore 126 terminating in a shoulder 128 that surrounds the counterbore 124. The carriage 36 is caused to reciprocate in the same direction as the axis of the feed tube 20 and the ram 26 upon rotation of the main drive shaft 90 by a Scotch yoke drive mechanism that includes the aforementioned yoke formed on the yoke plate 42 and a Scotch yoke crank arm assembly generally designated 130. The crank arm assembly 130 includes a gib plate 132 affixed to the flange 116 by screws 134 and having gibs 136 for a crank arm 138. For reasons discussed below, the gib plate 132 includes a U-shaped part connecting the gibs 136. The arm 138 has longitudinally extending, reduced thickness tongues 140 along the sides thereof that fit within notches 142 formed in the gibs 136. An aperture 144 extends through one end of the crank arm 138 and receives a trunion 146 having a flanged base 148 which is connected to the arm 138 by screws 150. The trunion 146 projects through the arm 138 and rotatably receives a slider or crosshead 152 that is held against longitudinal movement on the trunion 146 by a washer-like bearing member 154 having a non-circular hub that fits into a mating non-circular aperture in the end of the trunion 146 and is held therein by a screw 156. A wear plate 158 may be mounted on the arm 138 by flat head screws 160 that extend through countersunk apertures 162. As apparent, the crosshead 152 is slidably received within the yoke slot 46 on the carriage 36.

The crank arm assembly 130 further comprises a counterbalance plate 164 to one end of which is connected a counterweight 166 by screws 168. Both the crank arm 138 and the counterbalance plate 164 are slidable between the notched portions 142 of the gib 136 and the confronting face of the drive shaft flange 116. The crank arm 138 and the counterbalance plate 164 when assembled are in face to face contact and the arm 138 is cut away at 170 to provide space for the counterweight 166. Also the counterbalance plate 164 is cut away at 172 to provide space for the trunion base 148.

As readily apparent, by sliding the crank arm 138 in the direction permitted by the gibs 136, the distance between the crosshead 152 and the axis of rotation of the drive shaft 90 will change. Accordingly the effective length of the crank arm 138 and the length of the reciprocatory stroke of the carriage 36 can be adjusted. Similarly the position of the counterbalance plate 164 can be adjusted so as to most effectively counterbalance the rotating off center mass associated with the crosshead 152.

To provide for adjustment of the effective length of the crank arm 138 and the counterbalance plate 164, the counterbalance plate 164 is provided with a large aperture 174 and a transversely extending slot 176 and the crank arm 138 is provided with a transverse slot 178 aligned with the large aperture 174. The counterbalance slot 176 receives a shorter adjusting pin 180 and the crank arm slot 178 receives a longer adjusting pin 182 that extends through the aperture 174. The adjusting pins 180 and 182 are mounted in diametrically opposed relation on a clamp disc 184 that is welded or otherwise affixed to an elongate clamp rod 186. The rod 186 has a squared end 188 opposite the disc 184. It extends axially through the drive shaft 90 and is of such length that the clamp disc 184 is located within the larger diameter counterbore 126 and the squared end 188 projects beyond the outer end of the drive shaft 90. The squared end 188 extends through a clamping washer 190 that is mounted by screws 192 to the rear face of the drive shaft 90. The clamping washer 190 has a center aperture 194 that surrounds the squared end 188 and is adapted to bear against a shoulder 196 adjacent the outer end of the clamp rod 186.

Adjustment of the effective length of the crank arm 138 is obtained as follows. The screws 192 may be loosened to permit the clamp rod 186 to be rotated relative to the drive shaft 90 by engagement of its squared end 188 with a wrench or other suitable tool. Since the crank arm 138 and the counterbalance plate 164 cannot rotate relative to the drive shaft 90, rotation of the clamp rod 186 will cause the crank arm 138 and counterbalance plate 164 to slide relative to one another by virtue of the engagement of the adjusting pins 180 and 182 within the slots 176 and 178, respectively. As can be seen in FIG. 5, the minimum effective length of the crank arm 138 obtains when the adjusting pins 180 and 182 are aligned transversely of the arm 138. The maximum effective length is reached when the pins 180 and 182 are aligned on the same radius extending from the axis of the drive shaft 90 as the radius along which the crank arm 138 may be moved. As apparent, if the effective length of the crank arm 138 is increased or decreased by movement of the trunion 146 further from the axis of the drive shaft 90, the separation between the counterbalance weight 166 and the same axis will be correspondingly increased or decreased. The effective length of the crank arm may be indicated by a pointer and scale markings (not shown) on the outside face of the clamp washer 190 and the squared rod end 188. After the desired adjusted effective length of the crank arm 138 has been obtained, the screws 192 are tightened to force the clamping washer 194 against the rod shoulder 196 to in turn force the clamp disc 184 against the counterbalance plate 164. Therefore, the crank arm 138 is frictionally clamped between the counterbalance plate 164 and the notched portions 142 of the gibs 136.

Oscillation of the gear segment 78 and accordingly the ram 26 in appropriate timed relation to reciprocation of the carriage 36 is controlled by a cam plate 200 that is preferably lightened by plural holes 202 and is affixed to the rear face of the flange 116 by plural mounting screws 204 and held accurately in position by dowels 206. As apparent from the drawings, the cam plate 200 is a circular plate mounted eccentrically on the drive shaft 90. The eccentric mass of the cam plate 200 is counterbalanced by the U-shaped part of the gib plate 132.

The cam plate 200 is used to drive an oscillating drive plate or carriage 208 that is mounted for vertical reciprocatory motion by vertical guide rods 210 that are received within apertures in bosses or ears 211 located adjacent the four corners of the plate 208. The center portion of the plate 208 is cut away to provide clearance for the drive shaft 90. The vertical rods 210 are mounted in apertures in plural brackets 212 affixed to the far housing wall 104 of the housing 12 and connected in any suitable fashion to the top of the housing. For example, as shown in FIG. 2, the upper ends of the guide rods 210 may be connected by bolts 214 to mounting plates 216 which in turn are connected by bolts 218 to plates 220 affixed to the top of the housing 12.

A pair of cam follower rollers comprising an upper roller 222 and a lower roller 224 are mounted on the far face, as viewed in FIGS. 1 and 2, of the oscillating drive plate 208 in rolling engagement with the outer periphery of the cam plate 200. The upper roller 222 is journalled for rotation in a mounting plate 226 bolted directly to the oscillating drive plate 208. The lower cam follower roller 224 is mounted by a support plate 228 to a lever 230 that is affixed by screws 232 to the oscillating drive plate 208. Some tolerance may be provided between one of the screws 232 and the lever 230 and a follower adjustment screw 234 (FIG. 2) may be mounted in a boss 236 on the far face of the oscillating plate 208. A lock nut 238 is provided engaging the adjustment screw 234. As apparent, the adjustment screw 234 engages the bottom of the lever 230 and is used to position the lower roller 224 and the plate 208 such that both rollers 222 and 224 will assuredly engage the cam plate 200.

A horizontal, oscillating drive track 240 is affixed to the two bosses 211 at the upper corners of the plate 208. As shown in FIGS. 2 and 3, the track 240 has horizontal upper and lower surfaces engaged by roller elements 242 mounted on the upper end of a rack bar 244 that is mounted for vertical sliding movement in spaced bearings 246 affixed to the main drive carriage 36. The track 240 is sufficiently long that the roller elements 242 on the rack bar 244 can follow therealong throughout the entire stroke of the main drive carriage 36. The rack bar 244 carries a toothed rack 248 having teeth engaging the gear segment 78 and of sufficient length to remain engaged throughout the entire length of travel of the rack bar 244 in response to the reciprocal vertical movement of the oscillating drive plate 208. With this construction, the portion of the reciprocatory motion of the carriage 36 during which the oscillatory motion of the gear segment 78 occurs is accurately controlled by the eccentricity and angular location of the cam plate 200. For a given cam plate construction, the oscillations will invariably occur at the end of the reciprocatory strokes even in the event the effective length of the crank arm 138 is changed because of the fixed rotary relationship between the cam plate 200 and the crank arm 138.

In high speed winders it is already known that the movements of a carriage are desirably offset by a second, counterbalancing carriage in order to minimize vibrations. Accordingly, the preferred embodiment of the apparatus of this invention includes a counterbalance carriage 250 slidably mounted on guide rods 252 supported in the rearward and forward end walls 14 and 16. As shown in FIG. 1, the counterbalance carriage 250 may have a yoke 254 that receives a sliding crosshead 256 mounted on a counterbalance crank arm 258 guided and held by gibs 260 and counterbalanced by a counterbalance plate 262 carrying a weight 264. The assembly of these parts may be identical to the crank arm assembly 130 except that the gibs 260 are separate pieces, there being no need for a U-shaped counterbalancing plate part connecting them. The counterbalance plate 262 and counterbalance crank arm 258 may be clamped in the same manner described above utilizing a clamp rod 266 extending through the counterbalance drive shaft 100 that serves the same function as the clamp rod 186 described above. The throw of the counterbalance carriage 250 is desirably adjustable so that its mass will effectively offset the mass associated with the main drive carriage 36.

It will be observed that the several guide rods are provided with seals cooperating with the housing structure to prevent the escape of oil. Although the manner in which the parts are bathed with oil during operation is not important to this invention and may take any suitable form, a mechanism is disclosed for discontinuing operation of the machine in the event of an inadequate supply of oil to the inside of the housing 12. With reference to FIGS. 2 and 3, an oil reservoir 270 may be mounted in the upper portion of the housing 12 through which oil is fed by tubing (not shown) through an end wall fitting 272. The top of the reservoir 270 is open so that the oil will overflow into the housing 12. A float switch 274 responds to a low oil level condition in the reservoir 270 to cause the machine operation to be discontinued. As shown in FIG. 2, the switch 274 may be supported by the top of the housing 12.

Conventional electric machine control circuitry (not shown) can be used for controlling operation of the drive motor 98. At all times when the motor 98 is driving, the reciprocatory and oscillatory motions of the ram 26 take place. Also the counterbalance carriage 250 continuously moves in a direction opposite to the direction of motion of the main drive carriage 36. Suitable electrical or electromechanical counters (not shown) may be utilized to determine the number of turns of wire wound in each coil and to stop operation of the motor 98. The starting of the motor 98 may be accomplished manually or, if automatic loading and unloading of the stators to be wound are provided for, then the machine control circuitry could also be used to initiate operation of the motor 98.

Figures 6, 7:
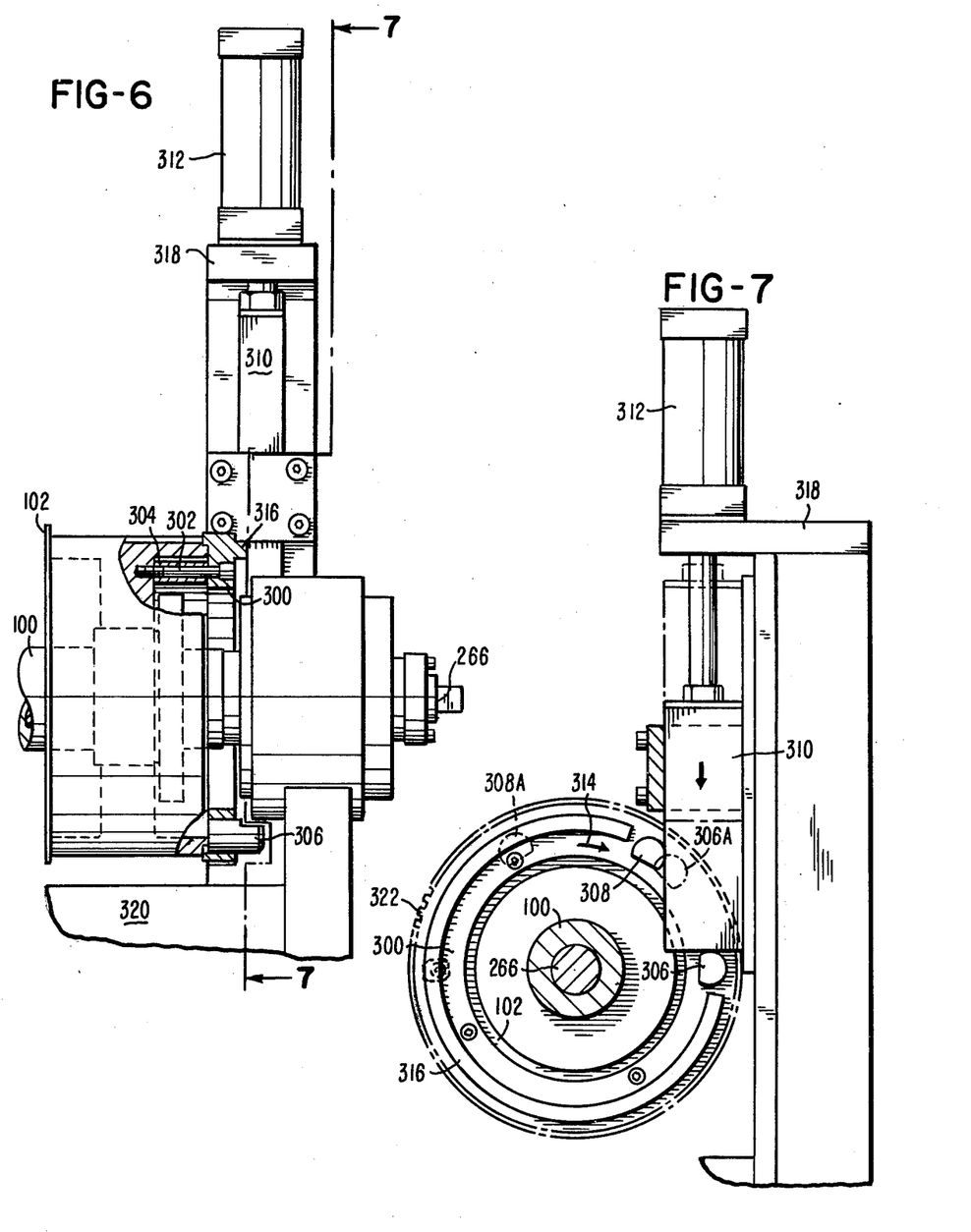
FIG. 6 is a fragmentary rear elevation with parts broken away and in section of a portion of a counterweight drive shaft and a positive stop or positioning mechanism associated therewith.
FIG. 7 is a fragmentary cross sectional view of the apparatus shown in FIG. 6 taken along section line 7—7 thereof.

To insure that the winding head 30 is in the proper stop position and thus in the proper start position for the winding of the next pair of coils, a positive final stop and positioning device may be provided which is shown in FIGS. 6 and 7. This device includes a stop plate 300 mounted on and forming the outer end face of the counterbalance timing pulley 102 and affixed thereto by bolts 302 extending through spacers 304. A first or leading stop pin 306 and a peripherally spaced second or trailing stop pin 308 are affixed to the plate 300 and rotate therewith. The aforementioned machine control circuitry is designed to stop the drive of the motor 98 so that the plate 300 will stop in a position wherein the leading stop pin 306 is within approximately 45° of its final stop position. In FIG. 7 the final stop position of the leading stop pin 306 is shown in full lines. An initial stop position resulting from discontinuance of the drive of the motor 98 is shown by phantom lines 306A. Assuming that the plate 300 has stopped rotating with the leading stop pin in its position indicated at 306A, a positioning blade 310 driven by an air cylinder 312 is caused to move downwardly to engage the leading stop pin 306 and move it to its full line position shown in FIG. 7. During such motion the trailing stop pin 308 has moved from its position indicated by phantom lines 308A to its full line position wherein it abuts against a side face of the positioning blade 310. When the parts are in that position, the plate 300 is positively prevented from rotating in either direction, the trailing pin 308 preventing clockwise rotation and the leading pin 306 preventing counterclockwise rotation. (The arrow 314 in FIG. 7 is used to indicate the direction of rotation of the plate 300 when the motor 98 is driving).

A safety rail 316 is provided that extends circumferentially of and outwardly from the plate 300. In the event the machine control circuitry fails to stop the plate 300 such that the leading stop pin 306 can be engaged by the blade 310, the blade 310 will engage the safety rail 316 during its downward motion and be prevented from further downward motion. As will be understood by those familiar with automatic machine controls, the full line position of the blade 310 in FIG. 7 would be sensed by a suitable sensing switch (not shown) and would trigger the next operation of the machine. In the event the positioning member 310 cannot be moved completely down to the final stop position, the sensing switch would not be tripped so that no further machine operations would take place.

The blade 310 and air cylinder 312 may be mounted on a bracket assembly 318 supported on an outboard support bracket 320 which may also be used to support the outboard bearing for the counterbalance drive shaft 100. The stop plate 300 is shown to have circumferential gear teeth 322. These may be used for driving a powered take-up device of the type designated 36 in the aforementioned Peck patent.

Although the presently preferred embodiment of this invention has been described, it will be understood that within the purview of this invention various changes may be made within the scope of the appended claims.

Having thus described my invention, I claim:

1. Apparatus for converting rotary motion to combined reciprocating and oscillating motion of a ram comprising:
   a drive shaft,
   a cam mounted on said drive shaft, a first carriage mounted for movement in a first path perpendicular to the axis of rotation of said drive shaft, cam follower means mounted on said first carriage and engaging said cam so that, upon rotation of said drive shaft, said first carriage is caused to reciprocally move along said first path, a second carriage, a rack bar mounted for movement on said second carriage in a direction parallel to said first path, motion transmitting means connecting said first carriage to said rack bar for causing said rack bar to reciprocally move with said first carriage, means guiding said second carriage for movement in a second path perpendicular to said axis of rotation of said drive shaft and perpendicular to said first path, means mounting said ram on said second carriage with the longitudinal axis of said ram parallel to said second path, pinion means affixed to said ram driven by said rack bar to cause oscillation of said ram about its said longitudinal axis in response to reciprocal movement of said first carriage, a crank arm connected to said drive shaft for rotation therewith, a crosshead mounted on said crank arm, and means defining a yoke on said second carriage engaged by said crosshead so that said second carriage is caused to reciprocally move along said second path when said drive shaft is rotating.

2. The apparatus of claim 1 wherein said motion transmitting means comprises a track mounted on said second carriage and roller means connected to said rack bar and engaging said track during the entire reciprocating motion of said second carriage.

3. The apparatus of claim 1 wherein said crank arm has an adjustable fixed length relative to the axis of said drive shaft.

* * * * *